3,438,353
CANDYING APPARATUS FOR
COATED CONFECTIONERY
Pietro Pellegrini, Milan, Italy; Colomba Quadri Pellegrini, heir of said Pietro Pellegrini, deceased; Jole Lazzaretti Pellegrini, heir of said Pietro Pellegrini, deceased, and guardian of Carla Pellegrini, minor; said Colomba Quadra Pellegrini assignor to said Jole Lazzaretti Pellegrini as guardian of Carla Pellegrini
Continuation of application Ser. No. 391,900, Aug. 25, 1964. This application Oct. 4, 1967, Ser. No. 672,927
Claims priority, application Italy, Mar. 7, 1964, 44,800/64
Int. Cl. A23g 3/26
U.S. Cl. 118—19                                    4 Claims

ABSTRACT OF THE DISCLOSURE

A drum for candying tablets or the like having a narrow central cylindrical portion with internal blades thereon and a tapered frusto-conical portion at each end of the cylindrical portion, the conical portions having greater axial length than the cylindrical portion and serving for the circulation of the material to be candied, the central portion serving to return the material to the frusto-conical portions.

---

This application is a continuation of application Ser. No. 391,900, filed Aug. 25, 1964, now abandoned.

This invention relates to candying apparatus for the manufacture of coated confectionery, medicinal pills and the like.

Previously, machines used for this purpose were subject to several disadvantages. They required constant supervision by a skilled operator and were only suitable for processing small quantities of material, not exceeding about 150 kgs. Furthermore, the quality of the product was very dependent on the uniformity of the materials used and the skill of the operator. These methods were therefore inefficient and expensive when used for large scale production.

The apparatus according to the present invention seeks to overcome the above disadvantages by providing a candying machine of large capacity requiring little skill or supervision in operation and negligible maintenance and capable of making a product of perfect uniformity of color and ingredients.

The invention provides a candying apparatus comprising a drum in the form of a cylinder whose ends are tapered in the form of truncated cones, mounted so as to rotate about its main axis, the said axis being horizontal and having two openings, one at each end, coaxial with the said axis, and a plurality of agitating blades staggered from each other and arranged around the central portion of the said drum on the inside thereof, whereby during the rotation of the drum around the said horizontal axis, the material to be candied is rolled up and automatically mixed without requiring the manual intervention of the operator.

The drum consists of three portions welded together, namely a central cylindrical portion and two frustoconical end pieces.

Also there are preferably two annular crowns fixed to the drum, one on each side, so that it can be supported on and rotated by two pairs of rubber-covered driving rollers which can be controlled by means of a reduction gearing and speed regulator.

The central portion of the drum contains a door for discharging the candied material and washing fluid.

Other features of the invention will become apparent from the following description of a particular embodiment of the invention, illustrated in the accompanying drawings in which.

With reference to the FIGURE 1 a drum 1 is mounted so as to revolve about a horizontal axis $a$ and consists of three portions 1A–1B–1C, the central portion 1A being cylindrical and welded to two frustro-conical portions 1B and 1C, hereinafter referred to as cups. To the central portion 1A a plurality of agitating blades 24 are secured, adjacent blades being inclined in opposite directions so as to displace the mass to be candied towards both cups 1A and 1C, wherefrom it is again returned to the central portion 1A by sliding on the inclined surface of the cups.

Figure 1:
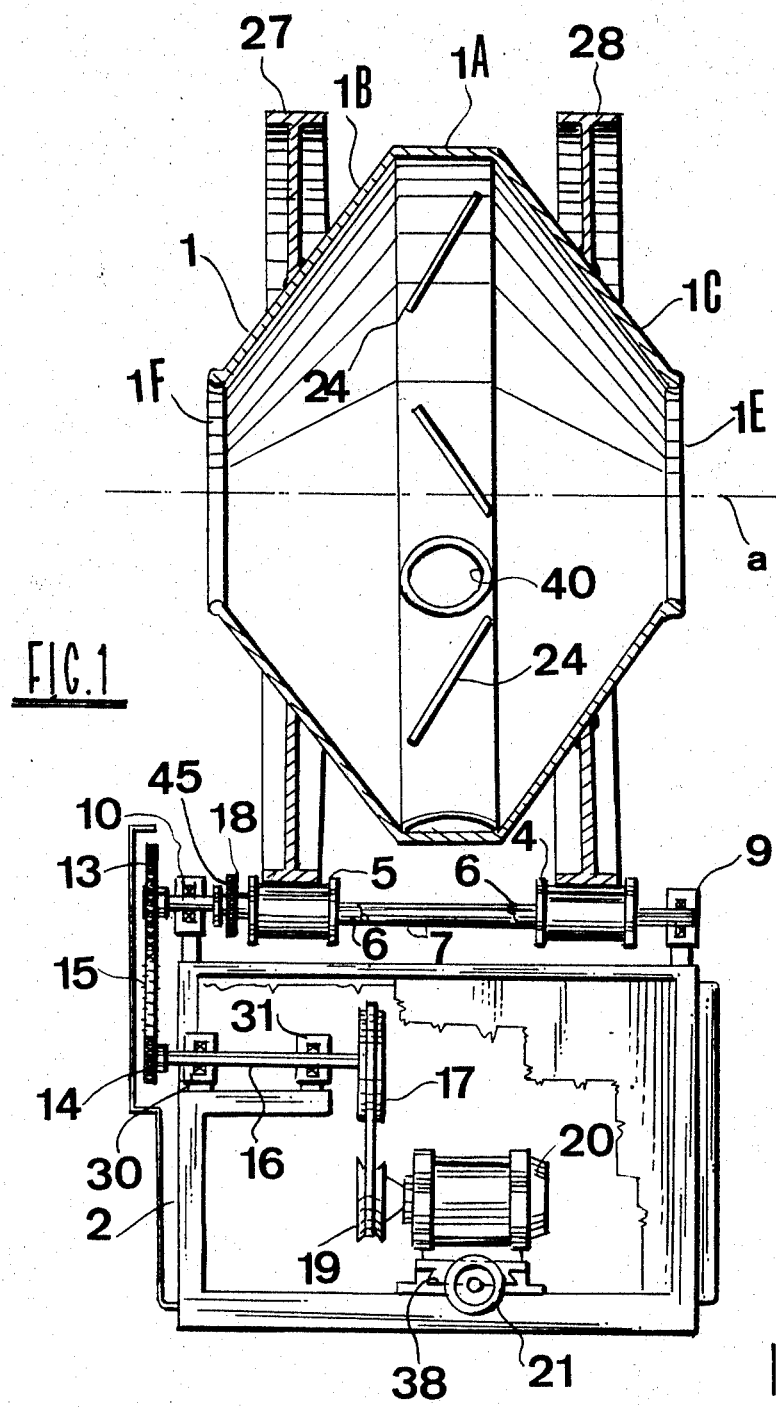
FIG. 1 is a vertical sectional view of the machine according to the invention taken through the rotational axis.
Figure 2:
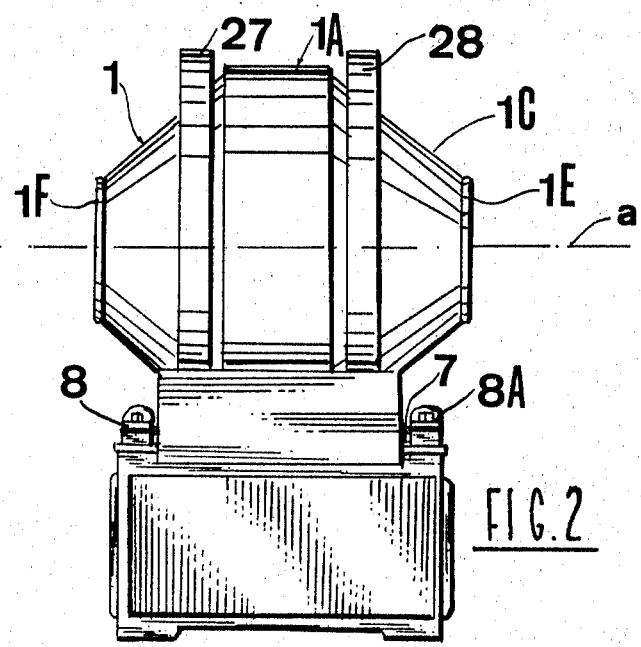
FIG. 2 is front elevational view.
Figure 3:
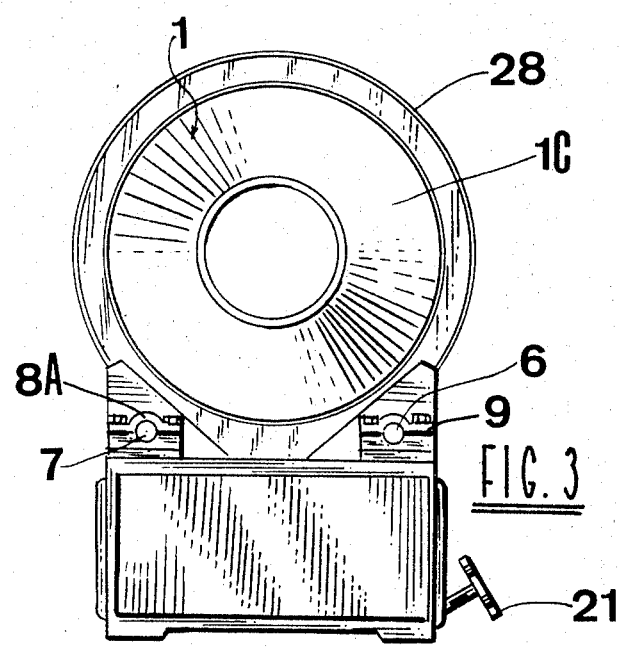
FIG. 3 is an elevational side view.

The drum 1 is rotated by two pairs of rubberized rollers 4, 5 of which only one roller from each pair is visible in FIG. 1. The rollers are unidirectionally rotated at an adjustable velocity by a transmission device hereinafter described.

The cups 1B and 1C have two annular crowns 27 and 28, secured thereto concentric with the axis $a$ and supported by rubberized rollers 4, 5 so that it is possible for the drum to be noiselessly rotated. At the same time it is possible to remove the drum 1 simply and quickly. A motor 20 drives an expandable pulley 19 and is mounted so that it can be moved along the slides 38 by means of the handwheel 21. The expandable pulley 19 drives a transmission pulley 17 keyed to a shaft 16 revolving in two supports 30 and 31. At the end of the shaft 16 opposite to the end to which the pulley 17 is fixed, a sprocket 14 is keyed. This drives another sprocket 13, keyed to shaft 6, by means of the chain 15.

The shaft 6 carries the rollers 4 and 5 having the rubber covering and a sprocket 45 which drives a similar sprocket (not visible on the drawing) keyed to shaft 7, which carries two rollers 4 and 5 by means of a chain 18. The shaft 6 is mounted in bearings 9, 10 and the shaft 7 is mounted in bearings 10A.

By operating the handwheel 21, the motor 20 is moved relative to the pulley 17 thus causing the expandable pulley 19 to vary its effective diameter and alter the speed of rotation of the drum 1. In the wall of the central portion 1A of the said drum a door 40 is provided serving to discharge the candied material at the end of the process and afterwards the washing liquid.

The two openings 1E and 1F at opposite ends of the drum 1 permit cooling, heating and ventilation of the contents as desired.

What is claimed is:

1. A mixing apparatus for coating discrete objects comprising an elongated hollow drum rotatable about a horizontal axis and including a center section having a substantially cylindrical inner circumferential face of predetermined length and two spaced frusto-conical end sections extending in mutually opposite directions from opposite axial ends of said center section, at least one of said end sections having an end remote from the center section with an opening therein, said end sections each having a length substantially greater than said length of the center section, each end section having an inclined inner circumferential face defining an inner cross-section which tapers inwardly in a direction away from said center section; a plurality of circumferentially spaced staggered agitating blades on said inner circumferential face of said center section and comprising deflecting faces leading in direction of rotation of said drum and some of which are inclined toward one of said end sections whereas others are inclined toward the other of said end sections; each of said agitating blades being restricted to said center section and extending from the region of one axial end of said center section to the region of the opposite axial end of said center section, support means supporting said drum for rotation about said horizontal axis and including two sets of rotatable, flanged friction rollers, longitudinally spaced flanges on said drum cooperating with the said flanged rollers; and drive means operatively associated with at least some of said friction rollers for driving the same and thereby rotating said drum about said horizontal axis, whereby during such rotation of said drum, materials to be mixed in the latter will be deflected by said deflecting faces of said agitating blades from said center section partly into one of said end sections and partly into the other of said end sections to thereby move from said inner circumferential face of said center section onto the inclined inner circumferential faces of the respective end sections, and material on said inclined inner circumferential faces of the respective end sections will return to said center section by sliding along said inclined inner circumferential faces of the respective end sections and onto said inner circumferential face of said center section, such movements resulting in circulation of the materials to be mixed between said sections of said drum.

2. A mixing apparatus as defined in claim 1 wherein both said end sections have openings therein at their ends, said openings being coaxial.

3. A mixing apparatus as defined in claim 1 wherein successive agitating blades face in alternating inclined directions.

4. A mixing apparatus as defined in claim 1, wherein said center section comprises a peripheral wall having an inner face which constitutes said substantially cylindrical inner circumferential face, said peripheral wall being provided with a discharge opening therein.

References Cited

UNITED STATES PATENTS

| | | |
|---|---|---|
| 662,516 | 11/1900 | Barklage. |
| 903,298 | 11/1908 | Lillard _____ 259—89 |
| 928,850 | 7/1909 | Comiskey _____ 259—175 |
| 1,150,896 | 8/1915 | Smith _____ 259—175 |
| 1,876,224 | 9/1932 | Harding. |
| 2,577,433 | 12/1951 | Robb. |
| 2,709,833 | 6/1955 | Wiklund. |
| 3,187,715 | 6/1965 | Wellard. |

WALTER A. SCHEEL, *Primary Examiner.*

J. P. McINTOSH, *Assistant Examiner.*

U.S. Cl. X.R.

259—81